Jan. 13, 1925.

D. S. ANDREWS ET AL 1,522,707

FREIGHT HANDLING SYSTEM

Filed Oct. 6, 1921  11 Sheets-Sheet 1

INVENTORS:
DONALD S. ANDREWS
JOHN RONALD WYLLIE

By

ATTORNEY.

Jan. 13, 1925. 1,522,707
D. S. ANDREWS ET AL
FREIGHT HANDLING SYSTEM
Filed Oct. 6, 1921 11 Sheets-Sheet 2
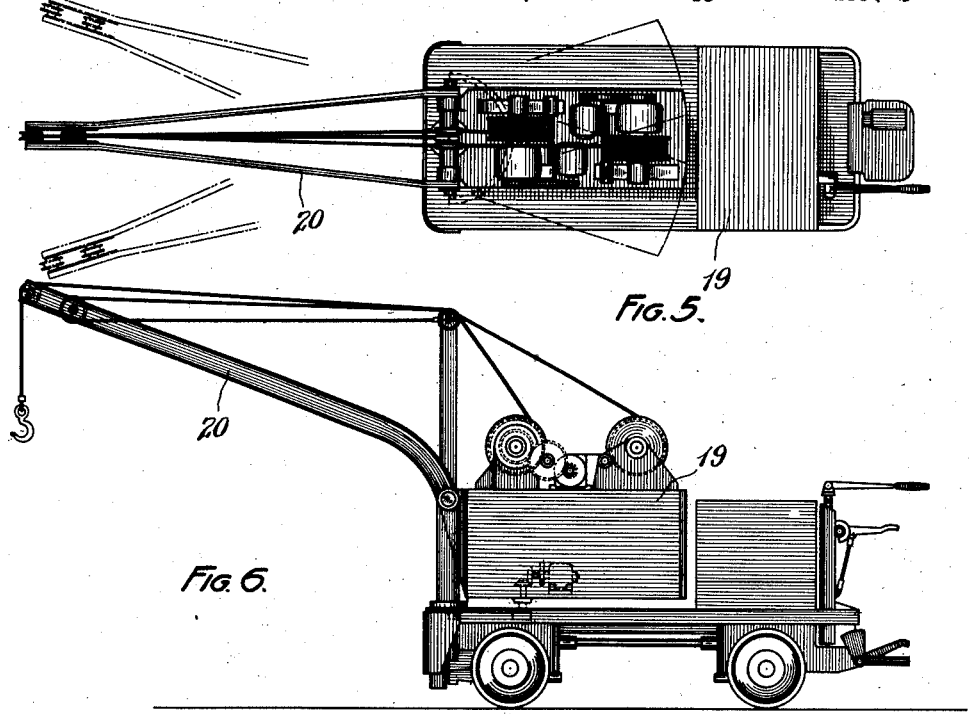
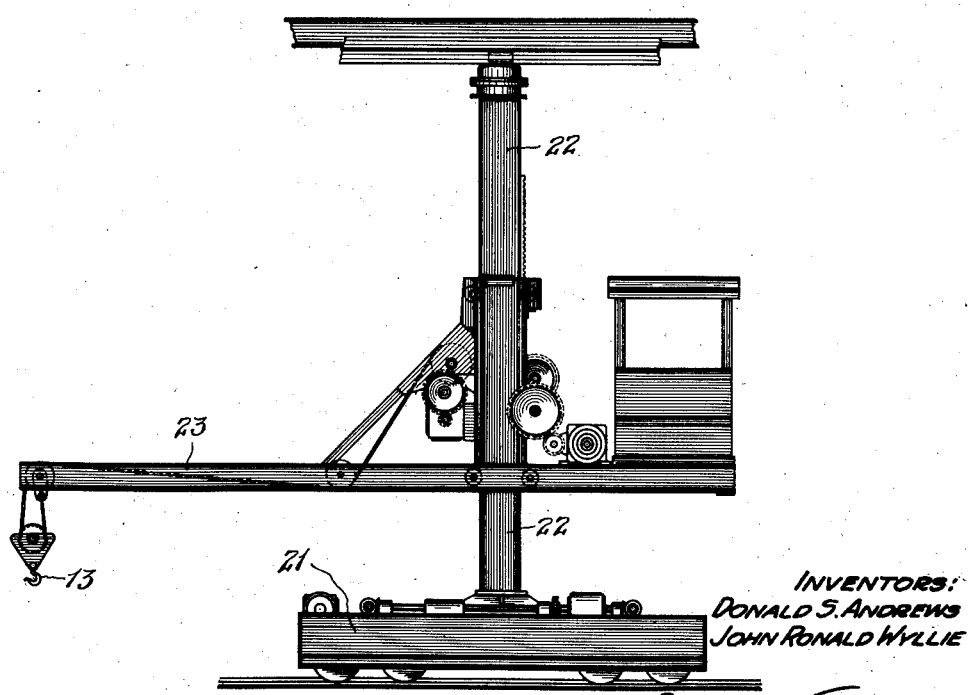
INVENTORS:
DONALD S. ANDREWS
JOHN RONALD WYLLIE
BY
*A. E. Merkel*,
ATTORNEY.

Jan. 13, 1925.                                                1,522,707
D. S. ANDREWS ET AL
FREIGHT HANDLING SYSTEM
Filed Oct. 6, 1921          11 Sheets-Sheet 3
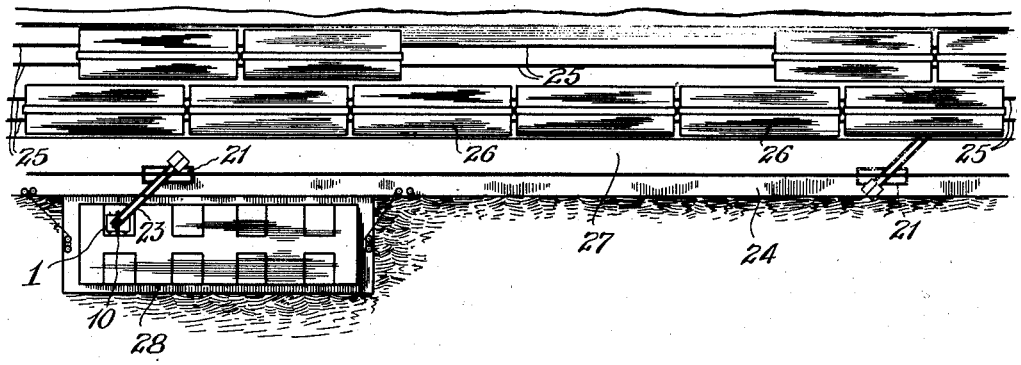
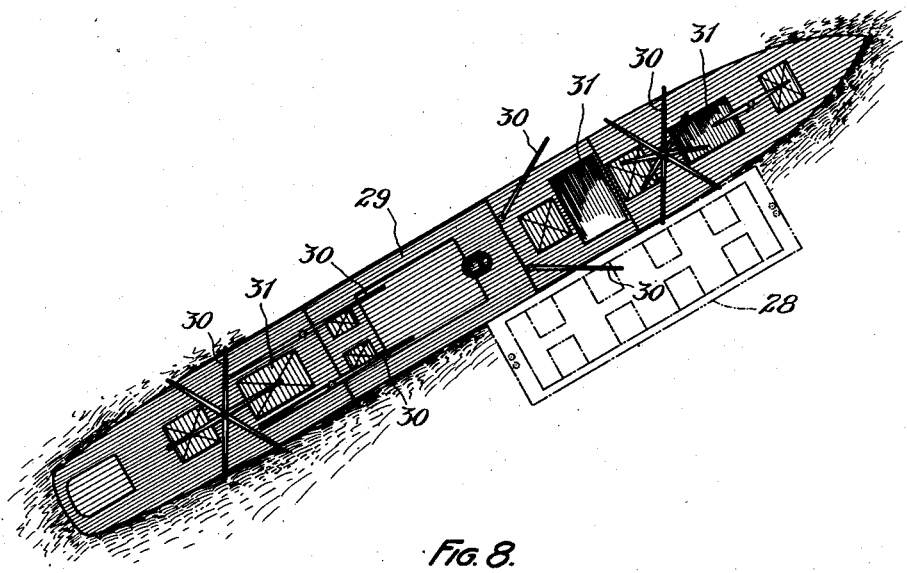
FIG. 8.
INVENTORS:
DONALD S. ANDREWS
JOHN RONALD WYLLIE
BY
ATTORNEY.

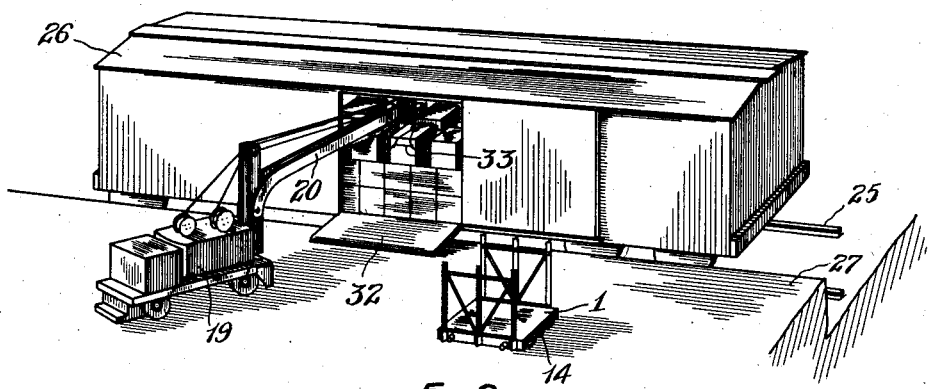
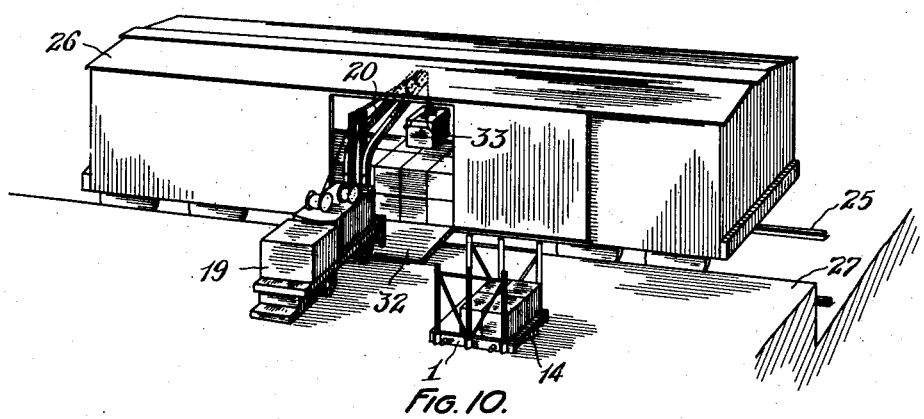
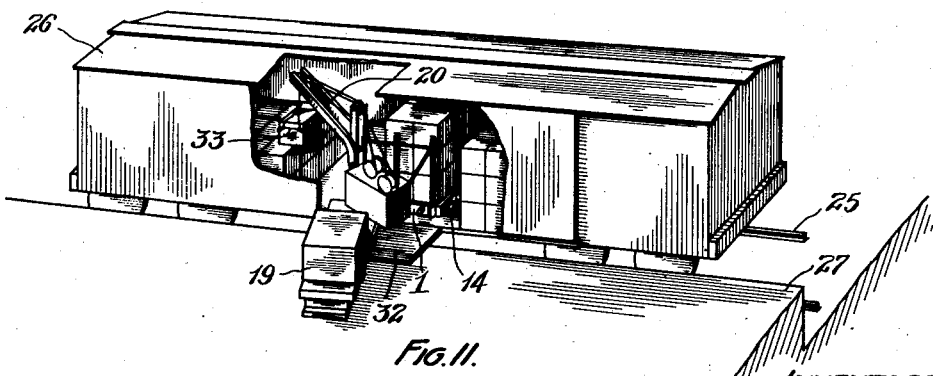

Jan. 13. 1925.
D. S. ANDREWS ET AL
1,522,707

FREIGHT HANDLING SYSTEM

Filed Oct. 6, 1921   11 Sheets-Sheet 5

INVENTORS:
DONALD S. ANDREWS
JOHN RONALD WYLLIE
BY
ATTORNEY.

Jan. 13. 1925.  
D. S. ANDREWS ET AL  
1,522,707  
FREIGHT HANDLING SYSTEM  
Filed Oct. 6, 1921  
11 Sheets-Sheet 6

INVENTORS:  
DONALD S. ANDREWS  
JOHN RONALD WYLLIE  
BY  
ATTORNEY.

INVENTORS:
DONALD S. ANDREWS
JOHN RONALD WYLLIE
BY
*C. E. Merkel,*
ATTORNEY.

Jan. 13, 1925.

D. S. ANDREWS ET AL 1,522,707

FREIGHT HANDLING SYSTEM

Filed Oct. 6, 1921 11 Sheets-Sheet 9

INVENTORS:
DONALD S. ANDREWS
JOHN RONALD WYLLIE
BY

ATTORNEY.

Jan. 13, 1925.  1,522,707
D. S. ANDREWS ET AL
FREIGHT HANDLING SYSTEM
Filed Oct. 6, 1921   11 Sheets-Sheet 11

INVENTORS:
DONALD S. ANDREWS
JOHN RONALD WYLLIE
BY
ATTORNEY.

Patented Jan. 13, 1925.

1,522,707

UNITED STATES PATENT OFFICE.

DONALD S. ANDREWS AND JOHN RONALD WYLLIE, OF NEW YORK, N. Y., ASSIGNORS TO ANDREWS CRANE CORPORATION, OF CLEVELAND, OHIO, A CORPORATION OF DELAWARE.

FREIGHT-HANDLING SYSTEM.

Application filed October 6, 1921. Serial No. 505,960.

*To all whom it may concern:*

Be it known that we, DONALD S. ANDREWS and JOHN RONALD WYLLIE, citizens of the United States, residents of New York, county of New York, and State of New York, have invented new and useful Improvements in Freight-Handling Systems, of which the following is a specification, the principle of the invention being herein explained and the best mode in which we have contemplated applying that principle, so as to distinguish it from other inventions.

This invention relates to methods of handling freight and has for its object to provide a method for transferring miscellaneous freight, rapidly and at small labor cost, particularly in the loading and unloading of ships. More specifically, it is the object of the present invention to provide a freight handling system which will enable all classes of freight to be expeditiously handled by means of traversing hoists which have heretofore not been capable of efficient use for transferring miscellaneous freight, but which have heretofore formed an essential part of ship loading and unloading equipment since they comprise the only means which have been found to be capable of practical use for loading and unloading the heavier articles of freight. It is a further object to provide a system of freight handling which can be quickly installed in connection with any of the existing loading piers without alteration thereof and at a small initial cost, which will greatly reduce the length of time required for transfer from freight cars to the ships and vice versa; and which will effect a large saving in labor costs. Other objects will be apparent from the following description.

The accompanying drawings forming a part of this specification, show in detail apparatus which may be used in carrying out the method and also show in sequence the various steps involved in the transfer of freight from a box car on the pier to the hold of a ship by the preferred method and also an alternative method in which goods are stored upon the pier as an intermediate step in the process of loading. The drawings, however, are merely illustrative of some of the various operations contemplated by this invention.

In the annexed drawings:

Figs. 1 to 7 inclusive show appartus which may be used in carrying out the method disclosed herein.

Fig. 5 is a top plan view of the tractor crane used for loading and unloading the freight from the platforms and for shifting the castor trucks with loaded platforms thereon.

Fig. 6 is a side elevation of the tractor crane.

Fig. 7 is a side elevation of the mono-rail crane mounted on the pier and used to transport platforms between the cars and lighters.

Fig. 8 is a plan view of the pier on which are railroad tracks with freight cars thereon, and a monorail crane, together with a lighter tied to the pier and a ship to which freight is carried by the lighter.

Figs. 9 to 24 inclusive illustrate in sequence the operations involved in the transfer of freight from a box car on the pier to the hold of a ship.

Fig. 9 shows the tractor crane removing the first package from the doorway of a box car.

Fig. 10 shows the boom of the tractor crane extending into the doorway and a platform beside the car partially loaded.

Fig. 11 shows the tractor crane outside the car loading a platform on the car floor adjacent the doorway.

Figure 12:
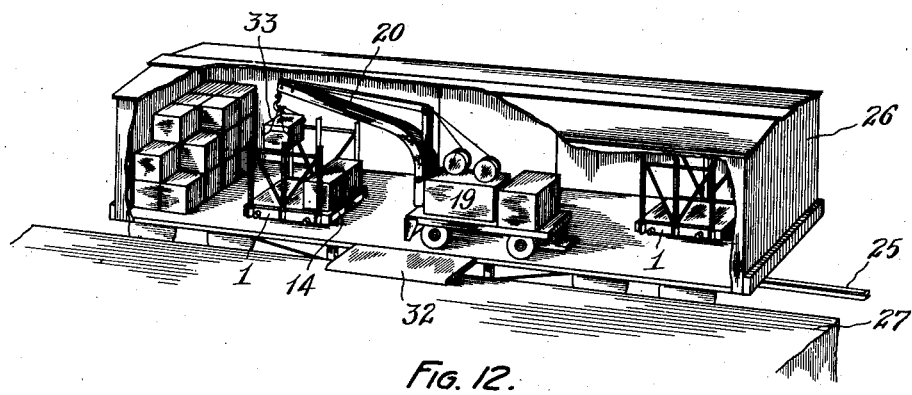

Fig. 12 shows the tractor crane within the car loading a platform which is mounted on a castor truck also within the car.

Figure 13:
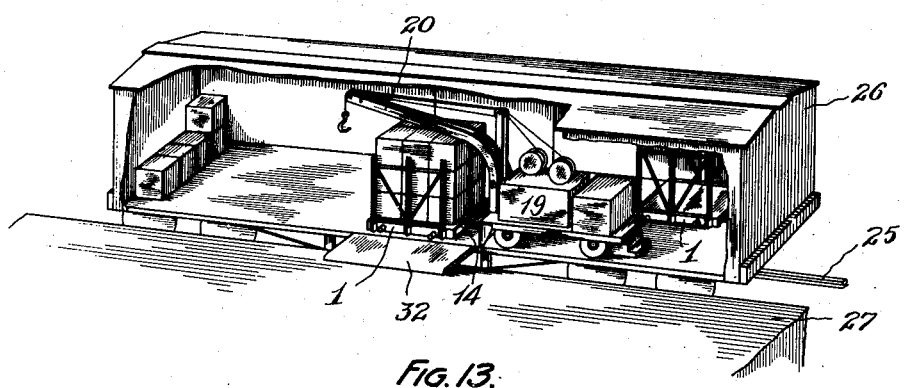

Fig. 13 shows the loaded platform shifted to adjacent the doorway by means of the tractor crane.

Figure 14:
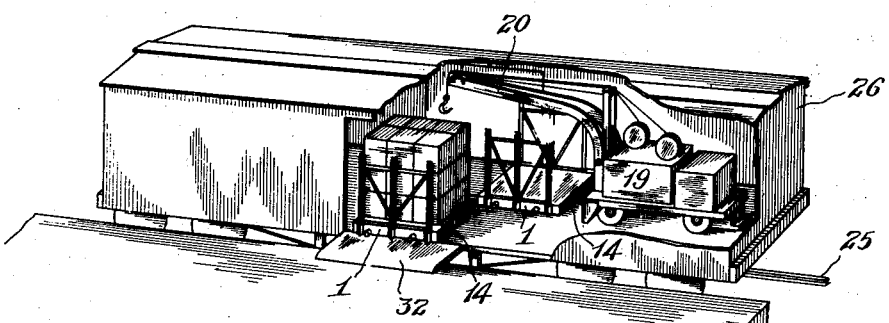

Fig. 14 shows the tractor crane pushing a castor truck carrying an empty platform to the end of the car for loading.

Figure 15:
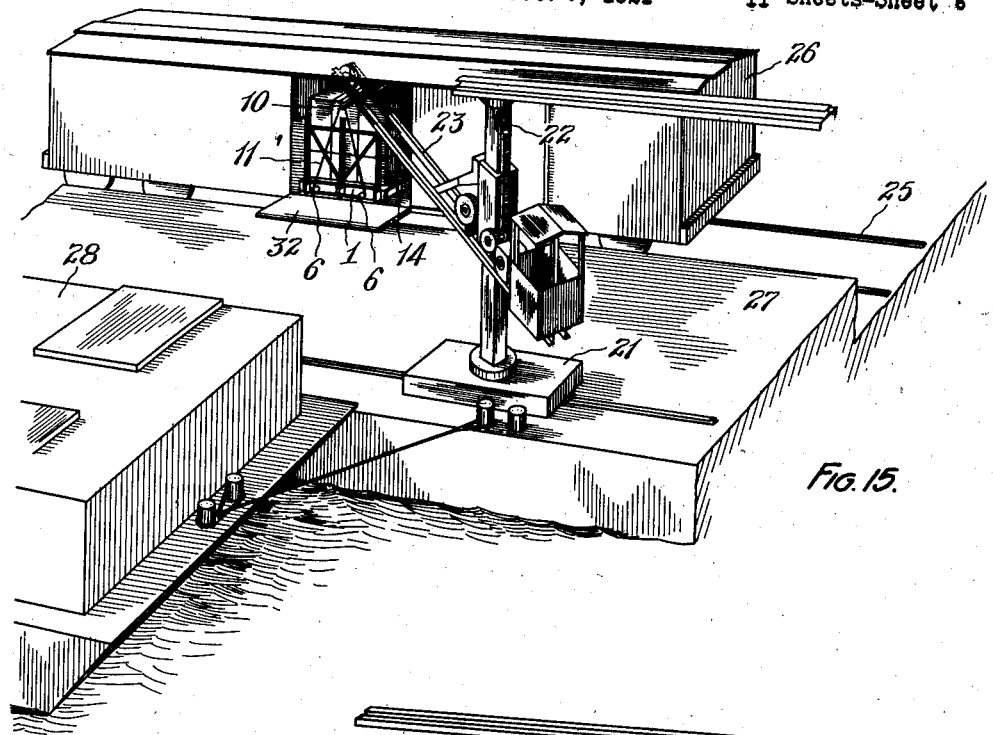

Fig. 15 shows the monorail crane removing a loaded platform through the doorway of the car.

Figure 16:
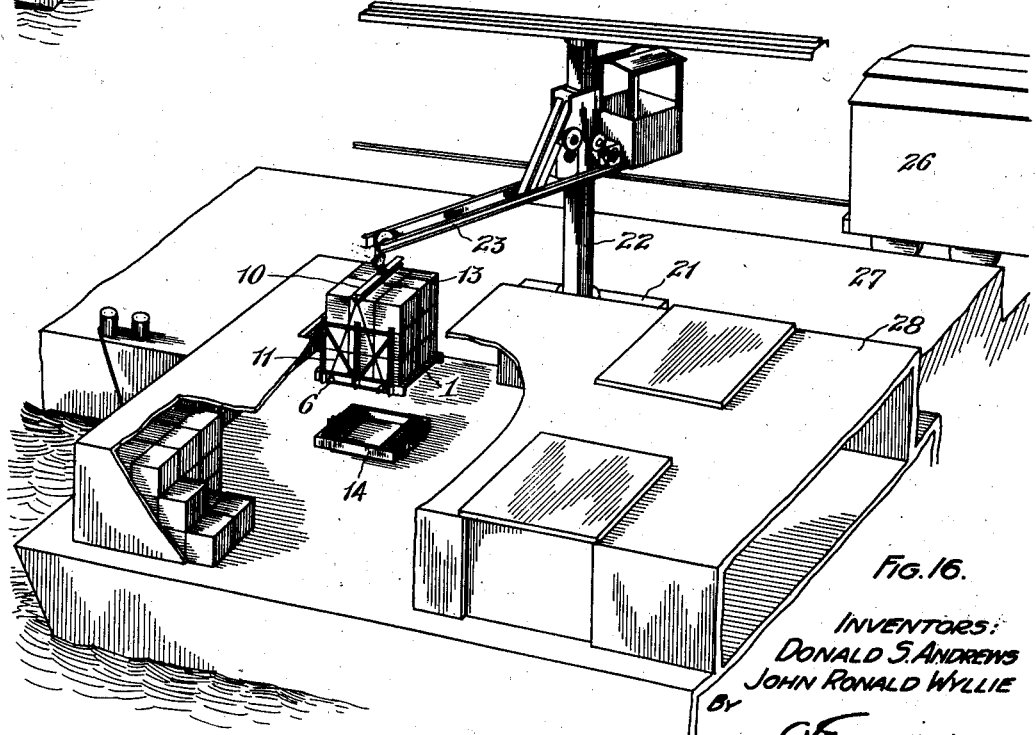

Fig. 16 shows the monorail crane lowering a loaded platform through one of the hatches of the lighter onto a castor truck.

Figure 17:
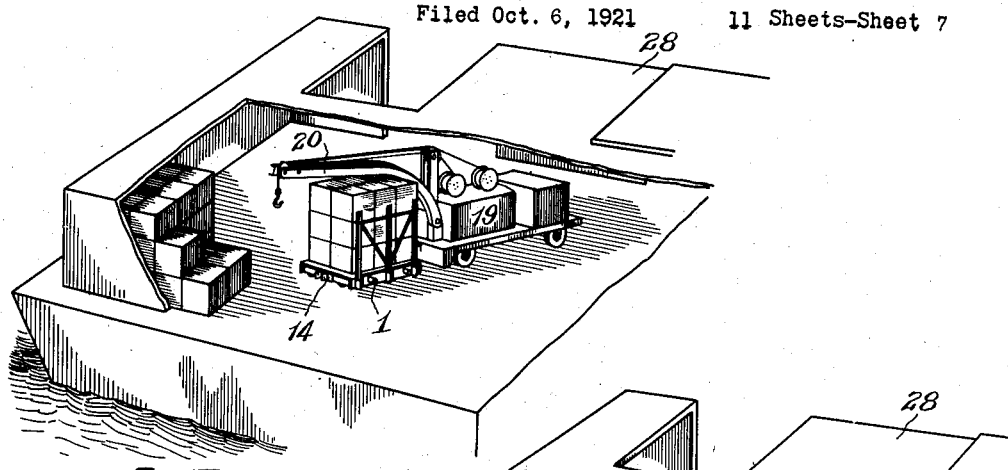

Fig. 17 shows a tractor crane on the lighter shifting the castor truck with a loaded platform thereon.

Figure 18:
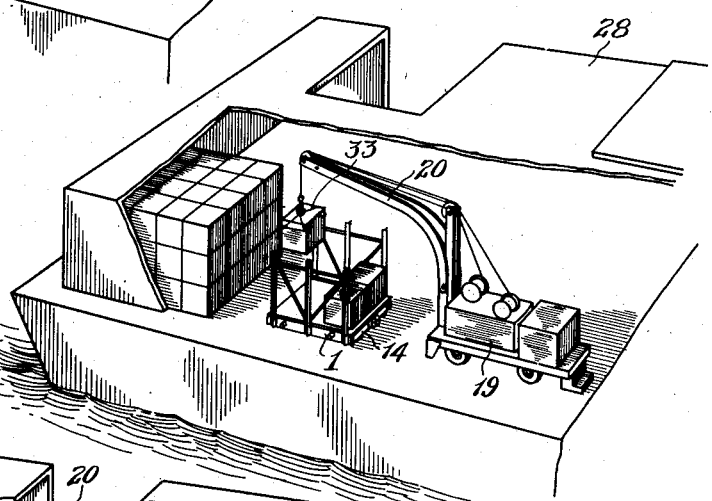

Fig. 18 shows the tractor crane unloading the platform and stowing the freight.

Figure 19:
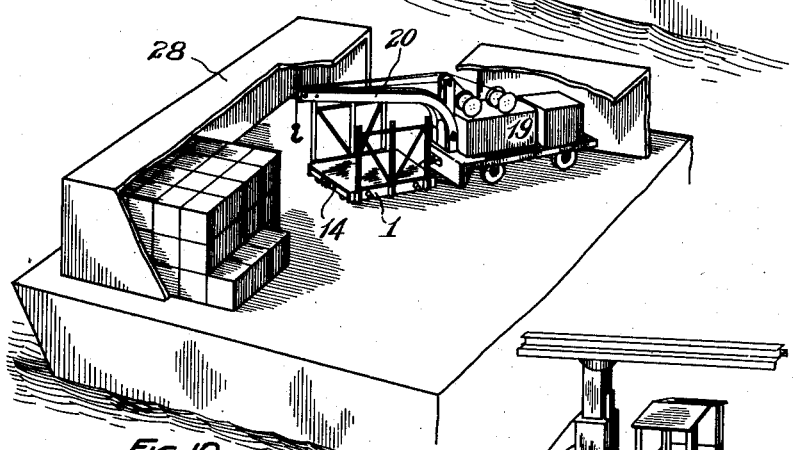

Fig. 19 shows the tractor crane returning a castor truck with an empty platform to a position beneath one of the hatches.

Figure 20:
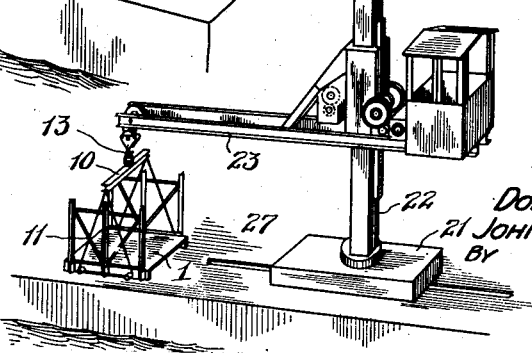

Fig. 20 shows the monorail crane returning with an empty platform.

Figure 21:
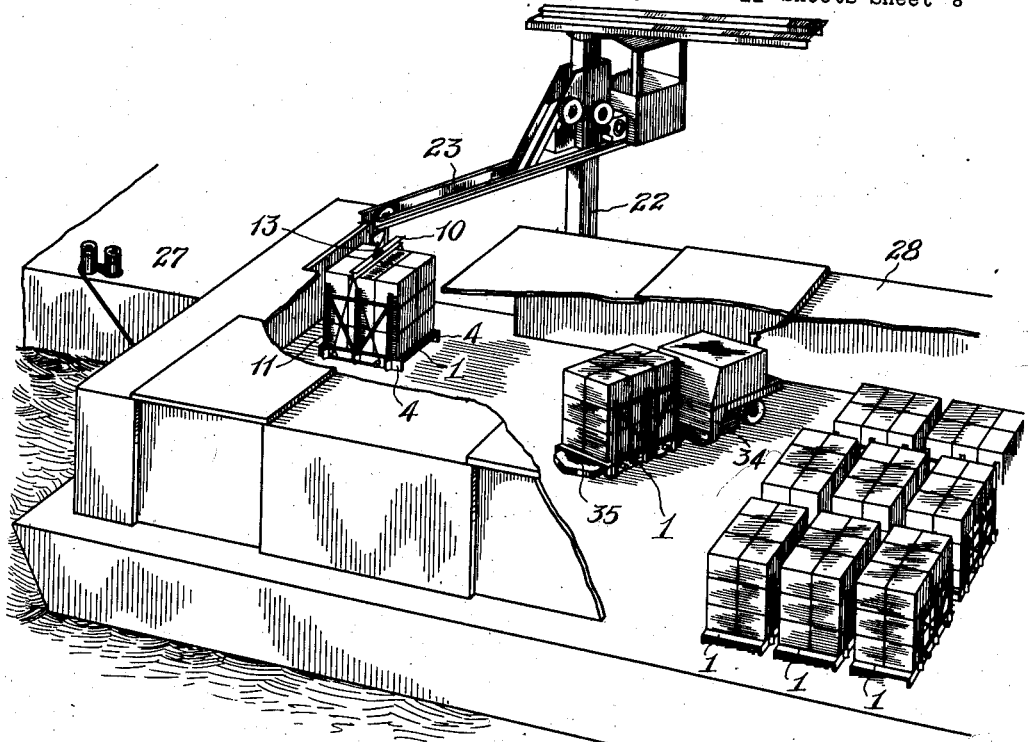

Fig. 21 shows the monorail crane lowering a loaded platform directly upon the deck of the lighter and an elevating tractor truck in the act of carrying a loaded platform away from a hatch to place it in the portion of the deck where the loaded platforms are being stowed.

Figure 22:
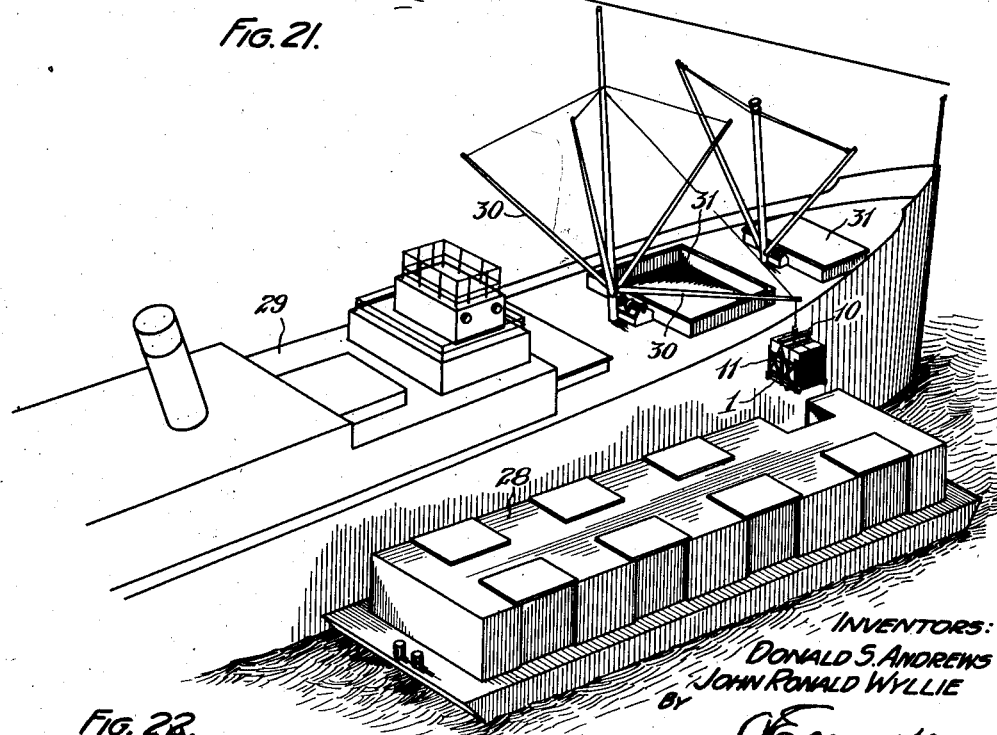

Fig. 22 shows a ship hoist in the act of hoisting a loaded platform through the hatch of the lighter.

Figure 23:
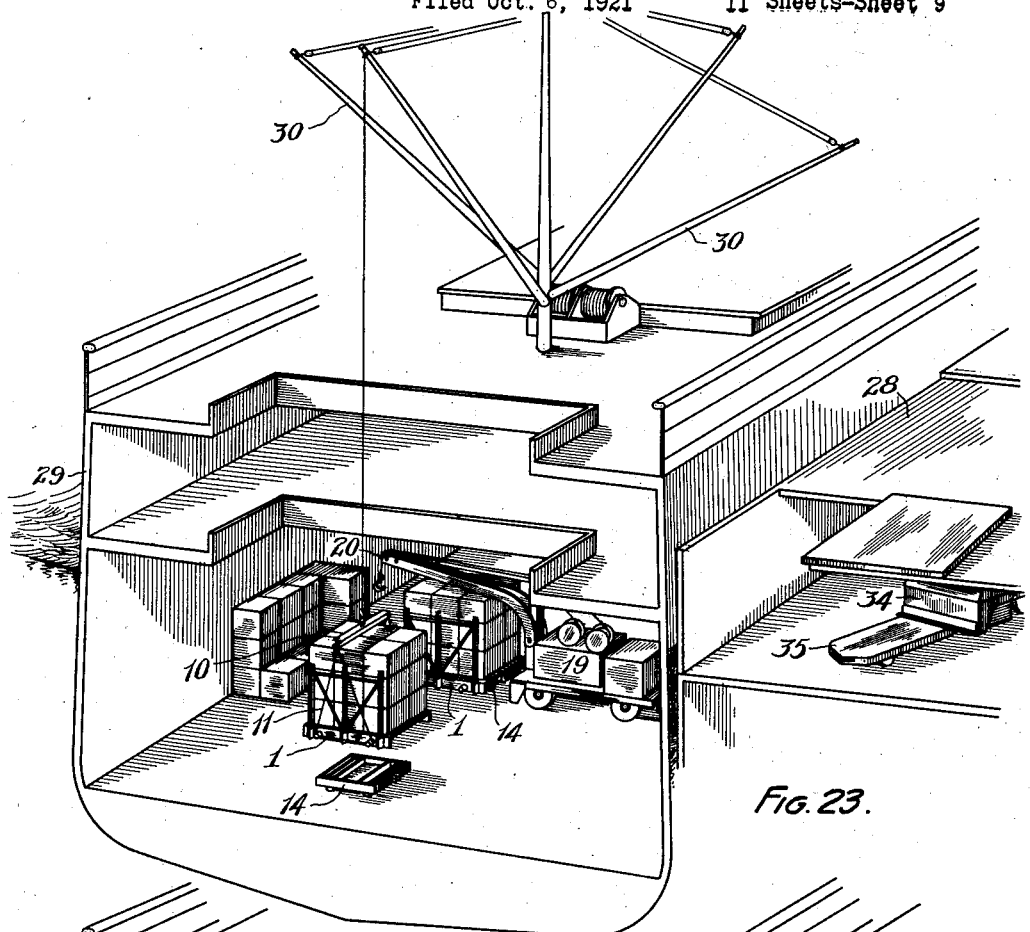

Fig. 23 shows the ship hoist lowering a loaded platform into the hold, a castor truck positioned to receive the loaded platform, and a tractor crane shifting a caster truck carrying a loaded platform from the hatchway to the portion of the hold where freight is being stowed.

Figure 24:
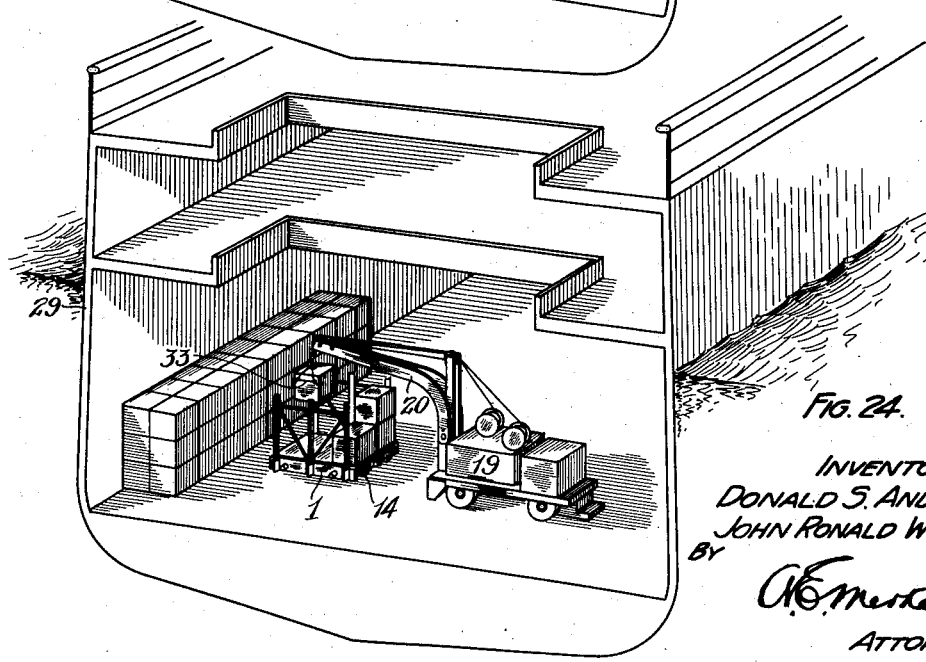

Fig. 24 shows a tractor crane unloading a platform and stowing the freight in the hold.

Figure 25:
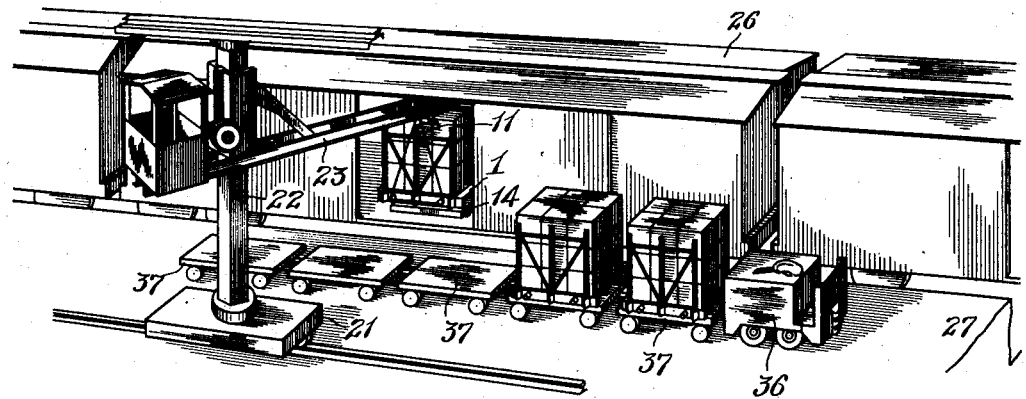
Figure 26:
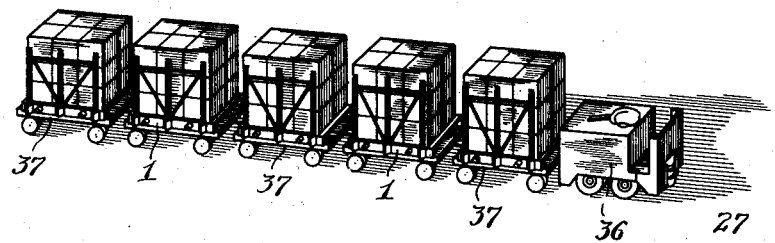
Figure 27:
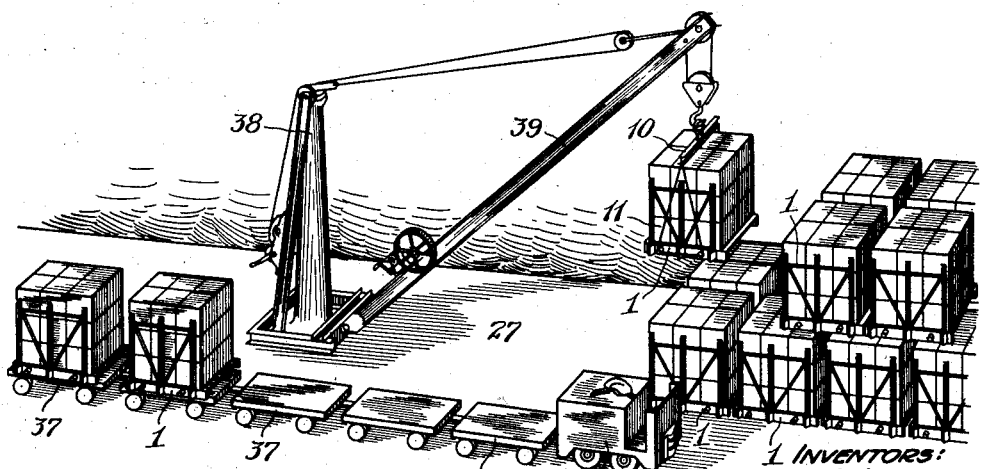

Figs. 25, 26 and 27 illustrate a modification of the method applicable to piers which extend out far enough to permit ships to be brought alongside for direct loading.

Fig. 25 shows the monorail crane transferring loaded platforms from a car to the trailer trucks of a tractor train.

Fig. 26 shows the tractor hauling such a train.

Fig. 27 shows a rotary crane stacking loaded platforms on the pier to await the arrival of the ship to be loaded.

Figure 28:
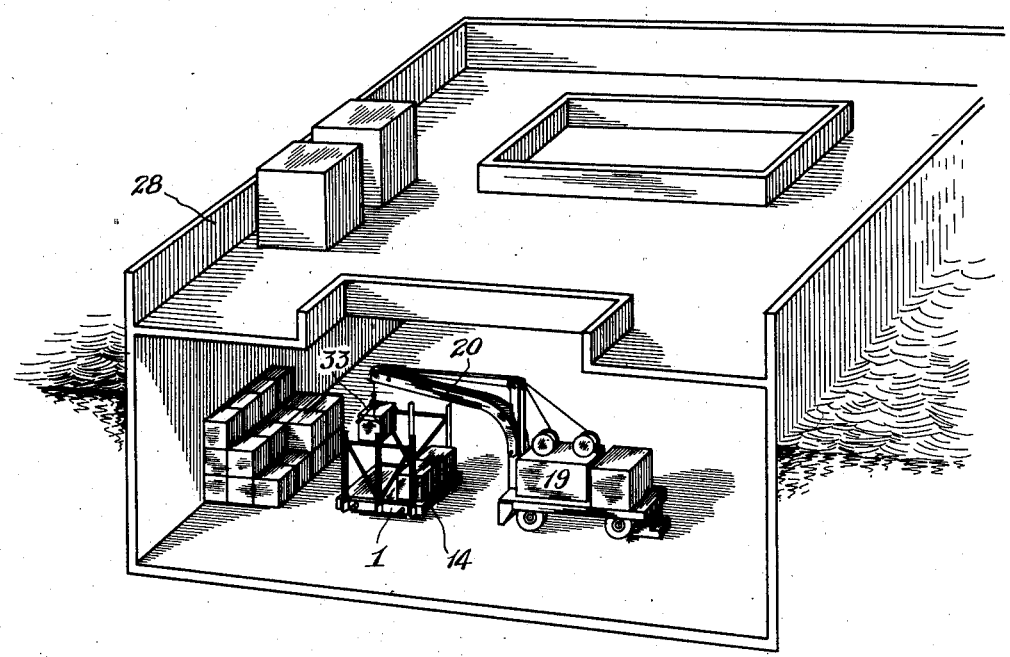

Fig. 28 shows a modification in which the hold of the lighter as well as the deck is loaded with freight.

Although a considerable number of complicated mechanical freight handling systems have been designed for the purpose of more expeditious transfer of miscellaneous freight from the pier to ships and from the ships to a pier, the actual use of such systems has been extremely limited for the reason that the old piers have to be reconstructed and the machinery required is complicated and expensive.

At the present time the piers in almost all the ports of the country are designed for transfer of the lighter packages of freight from the cars or from a storage warehouse to lighters by means of hand trucks. The pier platforms are raised above the tracks to about the level of the car floors and at a height above the water to permit trucks to be run over gangplanks to the deck of a lighter. The lighter packages of freight are loaded on hand trucks and transferred to or from the lighter thereon. For heavier articles of freight some type of traversing hoist is mounted on the pier. Transfer of freight between the lighter and ships is effected by means of cranes or other type of hoist mounted on the ship.

To some extent endless conveyors have been used to transfer from a pier to a lighter or from the pier to the hold of a ship. Such endless conveyors, however, require additional tracks on the pier and are cumbersome and expensive. The endless conveyors, moreover, can be used only for handling the lighter packages of freight and it is always necessary to have some type of crane working alongside the conveyor to transfer the packages or articles of freight too heavy for the conveyor.

According to the present invention light steel platforms together with one or more castor trucks and tractor cranes are transferred to the place from which freight is being taken. The empty platforms are placed successively upon the castor trucks, loaded by means of the tractor crane, the trucks with the loaded platforms thereon are then shifted by means of the tractor crane to a position where the platforms can be engaged by a traversing hoist and hoisted off the trucks and conveyed away by means of the traversing hoist. When the unloading point is reached the loaded platforms are deposited on castor trucks, hauled to the place where the freight is being stowed by a tractor crane, and the freight unloaded from the platform and stowed by means of the tractor crane. The lighter packages of freight may be loaded or unloaded from the platforms by hand when such handling is more expeditious and the castor trucks may be shifted by hand during loading and unloading whenever the loads are light enough to permit.

The operation at both the loading and unloading points is continuous, since other platforms are being loaded or unloaded while a loaded platform is being transported by the hoist.

It is proposed to provide platforms of such capacity that a loaded platform will constitute a capacity load for the traversing hoists, about three tons being considered a good working capacity, and to provide tractor cranes of somewhat less capacity than the hoist but of sufficient capacity to load the platforms with any freight not too bulky to be conveniently carried on the platforms.

Figure 1:
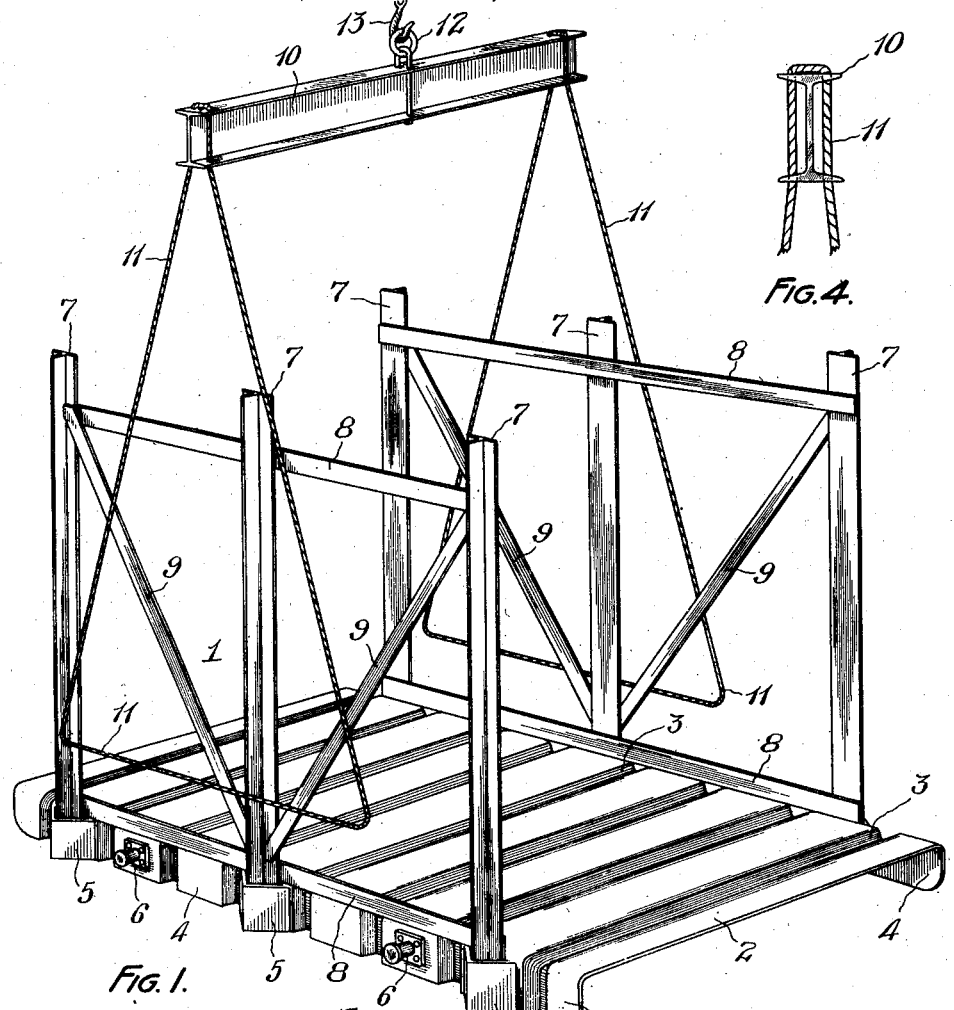
Fig. 1 is a perspective view of the freight carrying platform together with platform sling by means of which the platform is transported.
Figure 4:
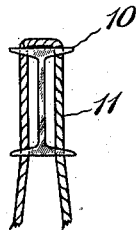
Fig. 4 is a detail view showing the attachment of a sling cable or rod to the spreader bar.

Tractor cranes of about two ton capacity have been found very satisfactory for this purpose. As clearly shown in Fig. 1, the freight carrying platform 1 comprises a pressed steel base member 2, formed with transverse stiffening corrugations 3 and depending side flanges 4. Secured to the side flanges 4 are stake sockets 5 and hoist engaging pins 6. Fitting in the sockets 4 are vertical posts 7, connected near the bottom and top by cross bars 8, and braced by the diagonal bars 9. The posts 7 with their connecting cross and brace bars form detachable load-retaining side frames for the platform. When the posts 7 are placed in the sockets 5, the lower cross bar 8 rests on the top of the base member 2. The side frames can be lifted off or put in place whenever it is convenient in loading and unloading the platforms.

For transporting the platforms there is provided a sling comprising a spreader bar 10 carrying depending loops 11 at the ends thereof, which may be depending cables or rigid rods, and which are adapted to be slipped over the pins 5 on the platform. The spreader bar 10 carries an eye 12 at the center thereof adapted to be engaged by a hook 13 of a traversing hoist.

Figure 2:
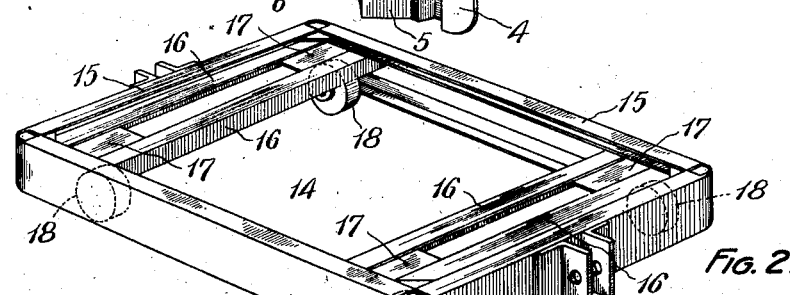
Fig. 2 is a perspective view of the castor truck or "dolly" adapted to receive the platform and by means of which the platform is shifted about in the loading and unloading operations.
Figure 3:
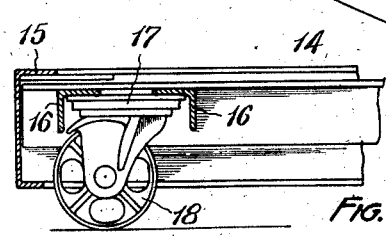
Fig. 3 is a fragmentary sectional detail view showing the swivel mounting of a truck castor.

As clearly shown in Figs. 2 and 3 the castor truck 14 comprises a rectangular channel iron frame 15 provided adjacent the ends with angle cross bars 16 having depending flanges between which are secured castor plates 17 in which are mounted swiveled castor wheels 18. The castor trucks are slightly narrower than the platforms to fit between the side flanges 4 thereof.

Figs. 5 and 6 show the tractor crane 19 used in the platform loading and unloading operations. This tractor crane is of the conventional type except that the pivoted boom 20 is longer than usual to permit the platform carried by a castor truck to be placed between the pile of freight and the tractor so that the tractor can be conveniently used to shift the castor truck during the loading or unloading operation. The crane 19 has low enough clearance to permit it to pass in and out of the side door of a box car.

Fig. 7 shows the monorail crane 21 which is mounted on the pier platform on tracks parallel with the railroad tracks and is used to transfer loaded platforms to and from lighters. The crane 21 has a mast 22 carrying a rotary and vertically and longitudinally movable boom 23.

Fig. 8 is a plan view of a portion of the harbor showing the pier 24 having a pair of railroad tracks 25 on which are box cars 26 and a raised platform 27 alongside the tracks; the monorail crane 21 mounted to travel along the platform; the lighter 28 tied to the pier, and the ship 29 with cranes 30 on the deck thereof adjacent the hatches 31.

We will now proceed to describe in detail the transfer of freight from a box car 26 on one of the pier tracks 25 to the hold of the ship 29. A tractor crane 19 together with a suitable supply of platforms 1 and one or more castor trucks 14 are placed on the pier platform adjacent the side door of the loaded box car 26 to or from which freight is to be taken. The side door of the car is opened and a gangplank 32 is laid across the space between the platform 27 and the floor of the car in the doorway. A platform 1 is set up preferably on a castor truck 14 on the pier platform adjacent the doorway of the car, (see Figs. 9 and 10). The end of the boom 20 of the tractor crane 19 is projected into the doorway and the packages are picked up by means of a suitable grapple 33 carried by the hoist line of the tractor crane. The packages are removed one by one from the car and deposited on the platform 1 by the tractor crane 19. When the platform is loaded it is engaged with the sling of the monorail crane 21 and hoisted off the truck 14 and transferred to the lighter.

When the freight adjacent the doorway of the car has been removed sufficiently, a platform is set up in the car adjacent the doorway and loaded by means of the tractor crane outside the car. (See Fig. 11.) When this platform has been loaded, the boom 23 of the monorail crane 21 is projected into the car doorway and the sling loops 11 are engaged with the pins 6 of the platform. The platform is then conveyed laterally out of the doorway of the car and transported to the lighter by the crane 21.

After the car has been unloaded sufficiently adjacent the doorway the tractor crane 19 is moved bodily into the car, the platforms 1 are set on castor trucks 14 within the car and the crane is used to load the platforms and shift them about in the car while loading, and also to shift the loaded platforms to adjacent the side door of the car for engagement with the sling of the monorail crane 21. (See Figs. 12, 13, 14 and 15.)

One method of stowing freight in the lighter is illustrated in Figs. 16 to 19 inclusive. As shown in Fig. 16 the monorail crane 21 carrying a loaded platform is brought alongside the lighter 28 and the platform is lowered through one of the hatches onto a castor truck 14. The truck with the loaded platform thereon is then pushed or hauled by the tractor crane 19 (see Fig. 17) to the portion of the deck where the goods are being stowed and unloaded by means of the tractor crane, (see Fig. 18).

After the platform has been unloaded the castor truck with the empty platform thereon may be hauled by the tractor crane to the portion of deck beneath a hatch (see Fig. 19) where the empty platform can be engaged with the sling of the crane 21 and carried back to the car on the return trip of the crane, (see Fig. 20).

The preferred method, however, of stowing freight in the lighter is illustrated in Fig. 21. In stowing the freight by this method the castor trucks 14 and tractor crane 19 are not used upon the lighter. The loaded platforms 1 are lowered through the hatch and deposited directly upon the deck of the lighter. A conventional type of elevating tractor truck 34 having a forwardly projecting elevating platform 35 is placed on the lighter. The elevating platform 35 is run beneath the platforms 1 between the supporting flanges 4, the platform 35 is then elevated to lift the platforms clear of the floor, and the truck 34 operated to carry the loaded platforms and stow them on the deck as shown at the right in Fig. 21.

When the lighter deck has been filled with loaded platforms, the lighter is towed out to the ship 29 and the loaded platforms are hoisted through the hatches of the lighter and lowered through one of the hatches 31 into the hold of the ship by means of one of the ship cranes 30 (see Fig. 22).

For stowing the freight in the hold of the ship one or more tractor cranes 19 and a plurality of castor trucks 14 are transferred to the hold of the ship from the lighter by means of one of the ship cranes 30. As shown in Fig. 23, a castor truck 14 is placed in the hold beneath the hatch as each loaded platform is lowered into the hold in position to receive the loaded platform. The tractor crane 19 is then used to haul the castor truck with the loaded platform thereon to the portion of the hold where the goods are being stowed and to unload the platforms and stow the freight as shown in Fig. 24. The cranes 30 may be used to transfer empty platforms back to the lighter on the return trips thereof or the platforms may be returned to the lighter by means of the cranes after the lighter has been emptied. When the ship has been loaded the tractor cranes 19 and castor trucks 14 are returned to the lighter by means of the cranes 30.

In unloading ships the empty lighter with a supply of portable platforms 1, castor trucks 14 and tractor cranes 21, is towed alongside the ship and the tractor cranes, castor trucks and platforms are transferred to the hold of the ship by means of the ship cranes 30. Empty platforms 1 are placed on castor trucks, loaded with freight, shifted to a position beneath the hatch and transferred to the lighter by means of the cranes 30. The loaded platforms are stowed on the lighter by means of the elevating tractor trucks 34 as in loading at the pier. When the lighter has been loaded it is towed to the pier and the loaded platforms hoisted through the hatches thereof by the monorail crane 21 and transferred either to cars or to a warehouse. In unloading the lighter at the pier the elevating tractor truck will be used to shift the loaded plaforms to the hatches. In loading a box car from the lighter the monorail crane 21 will carry the loaded platforms to adjacent the side door of the car, the boom 23 of the crane will be projected into the doorway of the car and the loaded platform lowered onto a castor truck 14. The truck will be shifted and the platforms unloaded by means of a tractor crane 19. When the ends of the car are filled the tractor crane will be shifted out of the car onto the platform, the loaded platforms will be deposited upon the pier platform beside the doorway and the car loaded adjacent the doorway by means of the tractor crane.

In is not to be assumed from the above description that all of the freight is handled in loading and unloading the platforms by means of the tractor crane. In miscellaneous freight there is usually considerable variation in the size and weight of the packages. The lighter packages may be loaded and unloaded by hand using the crane for handling the heavier packages. Where the packages are all light the cranes may be dispensed with and the loading and unloading may be entirely manual.

On the other hand some packages may be too bulky to be conveniently handled on a platform. In such a case they may be transferred to adjacent a car doorway or hatch by means of the tractor crane and there engaged with the traversing hoist and transported.

In long piers from which freight is transferred directly from the pier to the hold of a ship it is customary to provide a warehouse shed at the end of the pier and to store the freight therein for transfer to the ship. For such piers we provide a tractor train comprising a tractor 36 and trailer trucks 37 on the pier platform, (see Figs. 25, 26 and 27). The freight in a box car 26 is loaded on the platforms 1 in the same manner as above described, the tractor train is brought alongside the car and the loaded platforms are transferred from the car to the trailer trucks 37 by means of the monorail crane 21, as shown in Fig. 25. When the trailer trucks 37 have each received a loaded platform the tractor hauls the train out to the end of the pier where the loaded platforms are hoisted off the trailer trucks and stacked by means of a rotary jib crane 38 having a vertically adjustable boom 39, as shown in Fig. 27.

The holds of lighters used in transferring freight from piers to ships are not used for receiving freight but the freight is always carried upon the deck only, because of the labor involved in removing the freight from the hold. With our method of handling, however, the hold of the lighter can be conveniently used as well as the deck if desired, since the freight can be quickly removed from the hold by means of the portable platforms.

Fig. 28 shows a tractor crane unloading freight in the hold of a lighter. The loaded platforms, however, can be stowed in the hold of the lighter as well as on the deck as shown in Fig. 21.

From the above description it will be appreciated that we have provided a system for expeditiously handling all classes of freight by means of the traversing hoists which are a necessary part of the freight handling equipment in previous systems; that we have made possible such expeditious handling by providing load units which can be quickly assembled and engaged with the transporting means, which each approximate a capacity load for the transfer crane, and by providing a supply of portable platforms at the loading point have enabled the loading and unloading operations to be continuous, platforms being loaded at the loading point or unloaded at the unloading point while other loaded platforms are being transported by the hoists; and furthermore, that we have provided a system which requires a single crew for handling all classes of freight, which permits transfer of all classes of freight simultaneously, which takes the place of complicated and expensive conveyor systems and which can be quickly installed at small expense on existing piers. In addition to the advantages above referred to our system operates with equal facility at all heights of the tide and it enables freight to be stowed in any desired manner in the hold of the ship without loss in time since each load can be shifted to any portion of the hold with equal facility.

What we claim is:

1. The method of handling freight between ship and shore which comprises, loading said freight upon portable platforms; transferring said freight upon said platforms to a lighter; moving said lighter between ship and shore; transferring the freight from the lighter upon portable platforms; and removing the freight from the platforms to stow the freight in the hold of the ship.

2. The method of handling freight between ship and shore which comprises, placing portable platforms upon castor trucks; loading said platforms; shifting said trucks from the loading point to a point accessible to a hoisting and conveying mechanism; hoisting said platforms off said trucks and conveying them, by means of said mechanism, to a lighter; stowing said loaded platforms upon the lighter; moving said lighter between ship and shore; transferring the loaded platforms from the lighter and depositing them upon castor trucks; moving said trucks to the unloading point; and unloading said platforms.

3. The method of handling freight between ship and shore which comprises, loading said freight upon portable platforms; transferring said loaded platforms and stowing them upon a lighter; moving said lighter between ship and shore; transferring the loaded platforms from the lighter; unloading the platforms; and returning the empty platforms to the lighter.

4. The method of handling freight between ship and shore which comprises, mounting portable platforms upon castor trucks, loading said platforms, shifting said trucks, hoisting said platforms off said trucks, conveying them to a lighter and depositing them upon the lighter; shifting said platforms upon the lighter to stow the loaded platforms; moving said lighter between ship and shore, hoisting said loaded platforms off said lighter and depositing them upon castor trucks, shifting said castor trucks, and unloading said platforms.

5. The method of handling freight between ship and shore which comprises, mounting portable platforms upon castor trucks; loading said platforms by means of a tractor crane; shifting said trucks by means of said tractor crane; hoisting said platforms off said trucks and depositing them on a lighter; stowing said loaded platforms on the lighter by means of a tractor hoisting truck; moving said lighter between ship and shore; hoisting said loaded platforms off said lighter and depositing them on castor trucks; shifting said trucks by means of a tractor crane; and unloading said platforms by means of said crane.

6. The method of transferring freight from a pier to the hold of a ship which comprises, loading said freight upon portable platforms; hoisting said platforms, conveying them to a lighter and depositing them upon the lighter; shifting said loaded platforms to stow them upon the lighter; moving the lighter out to the ship; hoisting said loaded platforms from the lighter, lowering them into the hold of a ship, and depositing them upon castor trucks; shifting said castor trucks by means of a tractor crane to the portion of the hold where the freight is being stowed; and unloading said freight from said platforms and stowing it by means of said tractor crane.

7. The method of transferring freight from a box car to the hold of a ship which comprises, placing a portable platform upon a castor truck in the car; loading said platform; shifting said platform to adjacent the side door of the car; hoisting said platform off said truck, moving it laterally out of said doorway, conveying it to the hold of said ship and depositing it upon a castor truck; shifting said truck to the position of the hold where the freight is being stowed, and unloading said platform.

8. The method of transferring freight from a box car to the hold of a ship which comprises, placing a portable platform upon a castor truck in the car; loading said platform by means of a tractor crane; shifting said truck to adjacent the door of the car by means of said tractor crane; hoisting said platform off said truck; moving it laterally through the door of the car, conveying it to the hold of the ship and depositing it upon a castor truck; shifting said truck by means of a tractor crane to the portion of the hold where the freight is being stowed, and unloading said platform and stowing the freight by means of said tractor crane.

9. The method of transferring freight from the hold of a ship to a pier which comprises, bringing a lighter alongside said ship; transferring portable platforms from the lighter to the hold of the ship; loading freight upon said platforms; transferring said loaded platforms and stowing them upon the lighter; moving the lighter to the pier, and transferring said loaded platforms from the lighter to the pier.

10. The method of transferring freight from the hold of a ship to a pier which comprises, bringing a lighter alongside said ship; transferring portable platforms from said lighter to the hold of the ship; placing said platforms upon castor trucks; loading said platforms; moving said trucks to bring the platforms into position to be engaged by the unloading hoist; hoisting said loaded platforms from the hold and stowing them upon the lighter; moving the lighter to the pier and transferring said loaded platforms from the lighter to the pier.

11. The method of transferring freight from the hold of a ship to a lighter which comprises, bringing a lighter alongside the ship; transferring portable platforms from the lighter to the hold of the ship, mounting said platforms successively upon a castor truck; loading said platforms; moving said truck to position the platforms adjacent a hatch; hoisting said loaded platforms off the truck and through the hatch; and depositing said loaded platforms upon the lighter.

12. The method of transferring freight from the hold of a ship to a lighter which comprises, bringing a lighter alongside said ship; transferring portable platforms from the lighter to the ship; mounting said platforms successively upon a castor truck; loading said platforms by means of a tractor crane; shifting said truck by means of said tractor crane to adjacent a hatch; hoisting said platforms off the truck and through the hatch; and depositing said loaded platforms upon the lighter.

13. The method of transferring freight from the hold of a ship to a lighter which comprises, bringing a lighter alongside said ship; transferring from said lighter to the hold of the ship, a supply of portable platforms, a plurality of castor trucks and one or more tractor cranes; mounting portable platforms successively upon said trucks; loading each platform by means of a tractor crane, moving loaded trucks to a position adjacent a hatch by means of a tractor crane, and hoisting said platforms off said trucks through the hatch, and depositing the loaded platforms upon the lighter.

14. The method of transferring freight from a lighter to the hold of a ship which comprises, bringing a loaded lighter alongside said ship, transferring a plurality of castor trucks and one or more tractor cranes from said lighter to said ship; hoisting portable platforms loaded with freight from said lighter, lowering said platforms through a hatch; depositing each platform upon a castor truck in the hold, and moving the trucks, unloading the platforms, and stowing the freight in the hold by means of said tractor cranes.

15. The method of transferring freight from a box car to a lighter which comprises, mounting a portable platform upon a castor truck in said box car; loading said platform; shifting said truck to bring the loaded platform adjacent the side door of the car; engaging said platform with a traversing hoist; and hoisting said loaded platform off said truck, moving it laterally through the doorway and transferring it to said lighter.

16. The method of transferring freight from a box car to a lighter which comprises, mounting a portable platform upon a castor truck in said box car; placing a tractor crane in said car; loading said platform by means of said tractor crane; shifting said truck by means of said tractor crane to a position adjacent the side door of the car; engaging said platform with a traversing hoist, and hoisting said platform off the truck, moving it laterally through the doorway and transferring it to the lighter.

17. The method of transferring freight from a lighter to a box car, on the pier which comprises, engaging a loaded platform on the lighter with a traversing hoist mounted on the pier; transferring said platform by means of said hoist to adjacent the side door of the box car; moving said platform laterally through the doorway and depositing it upon a castor truck; moving said truck to the portion of the car where freight is being stowed and unloading said platform.

18. The method of transferring freight from a lighter to a box car on the pier which comprises, engaging a loaded portable platform on the lighter with a traversing hoist mounted on the pier; transferring said platform by means of said hoist to adjacent the side door of the car; moving said platform laterally through the doorway and depositing it upon a castor truck, moving said truck to the portion of the car where freight is being stowed by means of a tractor crane; and unloading said truck and stowing the freight by means of said tractor crane.

19. The method of removing freight through an exit opening from a compartment which comprises, placing a portable platform upon a castor truck in said compartment; loading said platform with freight by means of a tractor crane; shifting said truck to a position adjacent the exit opening by means of said tractor crane; engaging said loaded platform with a traversing hoist mounted outside the compartment; and hoisting said platform off said truck, moving it through the exit opening and conveying it away by means of said traversing hoist.

20. The method of stowing freight in a compartment which comprises, placing a castor truck in said compartment; positioning said truck adjacent the entrance opening; hoisting a portable platform loaded with freight, moving said platform through said opening and depositing it upon said truck by means of a traversing hoist mounted outside said compartment; shifting said truck to the portion of the compartment where the freight is being stowed; and unloading said platform and stowing the freight.

21. The method of stowing freight in a compartment which comprises, placing a castor truck and a tractor crane in said compartment; positioning said truck adjacent the entrance opening; hoisting a portable platform loaded with freight; moving said platform through said opening and depositing it upon said truck by means of a traversing hoist mounted outside said compartment; shifting said truck to the portion of the compartment where the freight is being stowed by means of said tractor crane; and unloading said platform and stowing the freight by means of said tractor crane.

22. The method of stowing freight in a compartment which comprises, placing a tractor crane in said compartment; depositing freight in said compartment adjacent its entrance opening by means of a traversing hoist mounted outside said compartment; and stowing said freight in said compartment by means of said tractor crane.

23. The method of unloading a box car which comprises, opening a side door of the car; removing the freight adjacent the doorway by means of a tractor crane; carrying the freight away by means of a traversing hoist; placing said tractor crane in the car when the portion of the car adjacent the doorway has been emptied; shifting the freight in the car to adjacent the doorway by means of said tractor crane; and removing the freight from the car by means of said traversing hoist.

24. The method of unloading a box car which comprises, opening the side door of the car; placing a portable platform outside the car adjacent the open doorway; removing freight from adjacent the doorway and loading it upon said platform; transporting the loaded platform; placing a castor truck with a portable platform thereon in emptied portion of the car; loading said platform with freight; moving said platform to adjacent the doorway; and lifting said platform off said truck and removing said platform laterally through the doorway.

25. The method of removing freight from a box car which comprises, opening the door of the car, placing a portable platform outside the car adjacent the open doorway; removing freight from the car adjacent the doorway and loading it upon said platform by means of a tractor crane outside the car; mounting a portable platform upon a castor truck within the car; placing said tractor crane within the car; loading said platform with freight by means of said tractor crane; shifting said truck by means of said tractor crane to adjacent the doorway of the car; and hoisting said platform off the truck and removing it laterally through the doorway.

26. The method of handling freight which comprises, placing a portable platform upon a castor truck; loading said platform by means of a tractor crane; hauling said truck by means of said tractor crane; engaging said platform with a traversing hoist; lifting said platform off said truck and conveying it by means of said hoist; and unloading said platform.

27. The method of handling freight which comprises, placing portable platforms upon castor trucks; loading said platforms; hauling said loaded platforms on said trucks; transporting said platforms by means of a traversing hoist; unloading said platforms and returning the empty platforms to the loading point.

28. The method of handling freight which comprises, transporting portable platforms and a castor truck by means of a traversing hoist to the place from which freight is to be removed; placing said platforms successively upon said truck; loading said platforms; moving said truck to bring the loaded platforms to a point where they can be engaged with said hoist; engaging said platforms with said hoist and conveying them away by means of said hoist; and unloading said platforms.

29. The method of handling freight which comprises, transporting portable platforms, a castor truck and tractor crane by means of a traversing hoist to the place from which freight is to be removed; mounting said platforms successively upon said truck; loading said platforms with freight by means of said tractor crane; shifting said truck by means of said tractor crane to bring the platforms to a point where they are engageable with said traversing hoist; hoisting said platforms off the truck and conveying them away by means of said traversing hoist; and unloading said platforms.

Signed by us this 16th day of September, 1921.

DONALD S. ANDREWS.
JOHN RONALD WYLLIE.